United States Patent
Manchala

(10) Patent No.: US 8,743,382 B2
(45) Date of Patent: Jun. 3, 2014

(54) ON DEMAND SOFTWARE FOR PRINT WORKFLOWS

(75) Inventor: Daniel W. Manchala, Torrance, CA (US)

(73) Assignee: Xerox Corporation, Norwalk, CT (US)

(*) Notice: Subject to any disclaimer, the term of this patent is extended or adjusted under 35 U.S.C. 154(b) by 154 days.

(21) Appl. No.: 13/535,480

(22) Filed: Jun. 28, 2012

(65) Prior Publication Data

US 2014/0002833 A1    Jan. 2, 2014

(51) Int. Cl.
  *G06F 3/12* (2006.01)
(52) U.S. Cl.
  CPC ............ *G06F 3/1225* (2013.01); *G06F 3/1205* (2013.01); *G06F 3/1275* (2013.01); *G06F 3/1226* (2013.01)
  USPC ........................................ 358/1.13; 358/1.15
(58) Field of Classification Search
  None
  See application file for complete search history.

(56) References Cited

U.S. PATENT DOCUMENTS

| 5,839,119 | A | 11/1998 | Krsul et al. | |
| 6,330,549 | B1 | 12/2001 | Merkle | |
| 7,860,801 | B2 | 12/2010 | Manchala | |
| 2013/0100484 | A1* | 4/2013 | Hankins et al. | 358/1.15 |
| 2013/0107314 | A1* | 5/2013 | Steely et al. | 358/1.15 |
| 2013/0117063 | A1* | 5/2013 | Kamath et al. | 705/7.26 |
| 2013/0148145 | A1* | 6/2013 | Salgado | 358/1.13 |
| 2013/0304861 | A1* | 11/2013 | Gupta et al. | 709/217 |
| 2014/0007177 | A1* | 1/2014 | Buck et al. | 726/1 |

* cited by examiner

*Primary Examiner* — Satwant Singh
(74) *Attorney, Agent, or Firm* — Fay Sharpe LLP

(57) ABSTRACT

When providing cloud-based software services to a print customer or print shop for executing a print job, information related to one or more vendors that supply downloadable software that satisfies a print consumer's specified print job requirements is obtained and software from a selected vendor is downloaded. The downloaded software is inserted at a selected point in a print job workflow, and the print job is executed. The print consumer is charged on per-use basis for use of the downloaded software by providing a hashed payment word for each subsequent use of the downloaded software. A payment word chain comprising the initial hashed payment word and each successive hashed payment word is then provided to the vendor of the downloaded software, who performs a hash algorithm to verify the payment words and redeems the payment words for micro-payments.

20 Claims, 4 Drawing Sheets

ON DEMAND SOFTWARE FOR PRINT WORKFLOWS

BACKGROUND

The subject application relates to providing cloud-based print software services and submitting micro-payments such as word chains or the like on a per-usage basis. While the systems and methods described herein relate to cloud based print services and payment therefor, it will be appreciated that the described techniques may find application in other cloud-based software systems, other software service payment systems such as check card or debit card, PayPal™, etc., and/or other cloud-based payment systems.

Much of today's design of software solutions for print workflows (including cloud computing) requires sending data among various workflow task units that perform a certain task such as imposition, line thickening, color correction, etc. One problem with this approach is the large amount of data that needs to be sent around, which clogs networks and takes enormous time to transfer. Another problem relates to billing a user for downloaded software usage in an efficient manner.

One conventional approach involves a software vendor that sends a digitally signed message to the downloaded software, and the software verifies the signature. The protective part of the code controls the functionality of the software code enabling it to execute with "basic" or "extended" functionality as directed by the software vendor. Another approach relates to a micropayment mechanism that aggregates charges for printing and copying low cost documents and copyrighted material. Any advertisement material printed on the paper is used to subsidize the cost of printing. The user receives a statement on a regular basis and settles any outstanding debt using a standard payment mechanism.

Accordingly, there is an unmet need for systems and/or methods that facilitate cloud-based software service provisioning and micro-payment verification while overcoming the aforementioned deficiencies.

BRIEF DESCRIPTION

A method for providing cloud-based software services to a print customer comprises requesting information related to one or more vendors that supply downloadable software that satisfies a print consumer's specified print job requirements, receiving the requested information, selecting one of the one or more vendors, and downloading the software from the selected vendor. The method further comprises inserting the downloaded software at a selected point in a print job workflow, executing a print job using the print job workflow with the inserted software, and billing the print consumer on per-use basis for use of the downloaded software.

According to another feature described herein, a method of making micropayments for each use of a cloud-based software module comprises providing an initial hashed payment word $W_0$ for an initial downloaded software use, receiving certification from a cloud bank that the initial payment word is a valid payment word, providing a subsequent hashed payment word for each subsequent use of the downloaded software, and providing a payment word chain comprising the initial hashed payment word and each successive hashed payment word to the vendor of the downloaded software.

Yet another feature relates to a system that facilitates providing cloud-based software services to a print customer, comprising a processor configured to execute persistently stored computer-executable instructions, the instructions comprising a software search module that requests information related to one or more vendors that supply downloadable software that satisfies a print consumer's specified print job requirements. The instructions further comprise a workflow task creation module that receives the requested information, selects one of the one or more vendors, downloads the software from the selected vendor, and inserts the downloaded software at a selected point into a print job workflow, and a workflow manager that executes the print job using the print job workflow with the inserted software, and bills the print consumer on per-use basis for use of the downloaded software.

DETAILED DESCRIPTION

In accordance with various features described herein, systems and methods are described by which a workflow manager automatically orders a software on demand from a list of various sources that match the requirements of the (print) job, processes the job using the downloaded software, charges the customer for the usage, transfers data to the next task within the computing unit and pays the vendor(s) of the software services for the usage. In this manner, the described systems and methods securely make precise payments to the vendor. Functionality is built into the downloaded software to receive payment autonomously and execute the software.

The described systems and methods are different from shareware software that is either pre-paid before being downloaded or trial software that is given for free for the first 30 or 60 days, etc., as well as pay-per-click schemes wherein a central server maintains an audit log of clicks that are aggregated, and payment is made for an accumulated set of clicks. While the use of hashing is known in computer science, conventional approaches to date have not involved a software service that recognizes and consumes such a word set to account for payments, thus rendering each software service as an autonomous entity, capable of discharging its services upon the acceptance of payment. While the described workflow manager (located at a print shop) calls for the service (e.g., downloads the service from the cloud) and places it into the rightful place in the workflow, it is the software service that communicates with the previous task and the next task in the workflow to channel the data before and after transformation of the data. The software service also has the capability (to accept micropayments from the workflow manager whenever it renders its services to a (print) job. The method of accepting payments is described below.

Figure 1:
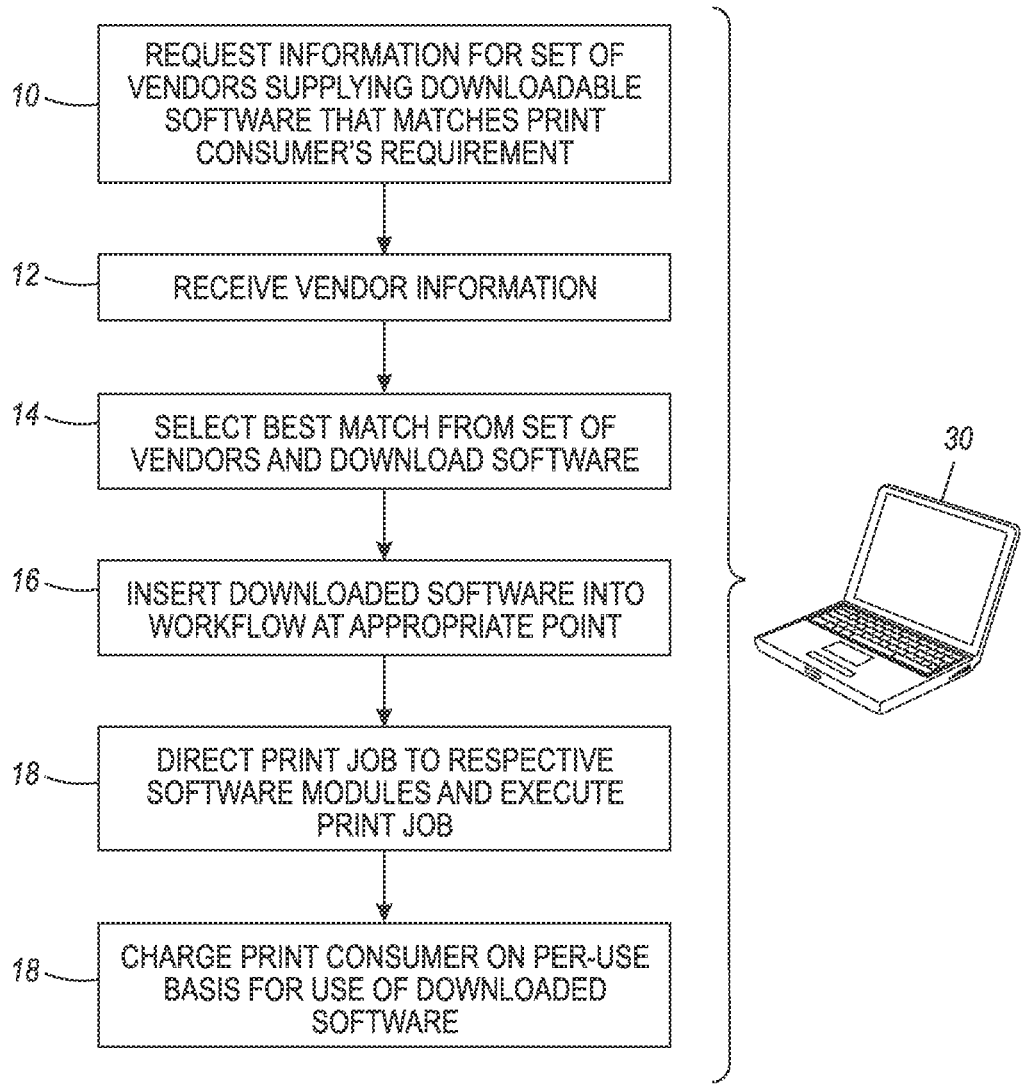
FIG. 1 illustrates a method of cloud-based software download and usage charging, in accordance with various aspects described herein.
Figure 2:
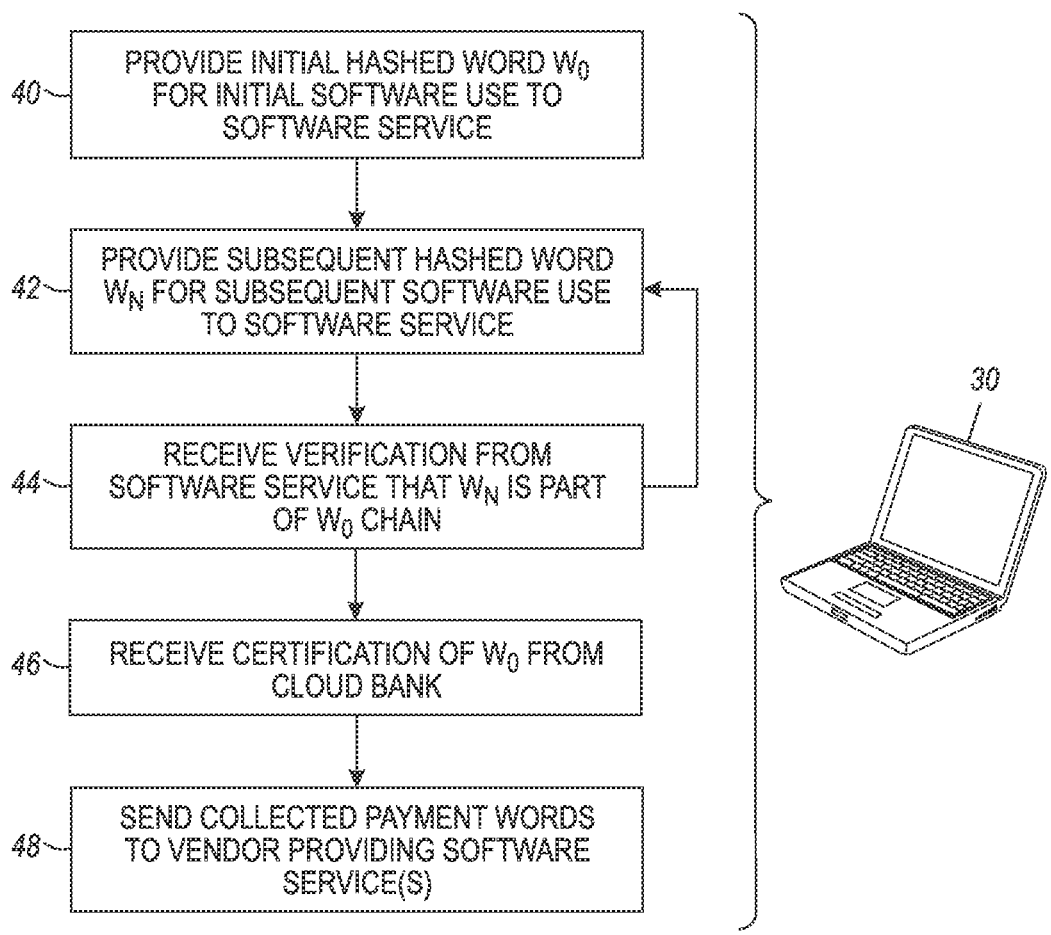
FIG. 2 illustrates a method for verifying pay-per-usage charges in a cloud-based print software service environment via payment words.

FIGS. 1 and 2 illustrate methods related to automatically identifying, downloading, and executing software for a customer print job, and charging the customer for the use of the downloaded software, in accordance with various features.

While the methods are described as a series of acts, it will be understood that not all acts may be required to achieve the described goals and/or outcomes, and that some acts may, in accordance with certain aspects, be performed in an order different that the specific orders described.

With reference to FIG. 1, a method of cloud-based software download and usage charging, in accordance with various aspects described herein. Cloud computing refers to technologies that provide computation, software, data access, and storage services that do not require an end-user to have knowledge of the physical location and configuration of the system and/or components that deliver the services. Cloud computing providers deliver applications via the internet, which are accessed from web browsers, desktops mobile apps, etc., while the business software and data are stored on remote servers. Accordingly, a "cloud" as referred to herein denotes an internet-based service provider that provides such computation services, software, data access, storage services, and the like, as will be understood by those of skill.

Accordingly, at 10, information is requested regarding one or more vendors that supply downloadable software that matches a print consumer's needs. The information may include, for instance, vendor identity, software identity, software functionality, or any other relevant information. At 12, the requested information is received. At 14, a best match is selected with respect to a user's (e.g., print consumer's) requirements from the set of vendors, and the vendor's software is downloaded. At 16, the downloaded software is inserted at an appropriate point in a print job workflow. At 18, the print job (and/or specific tasks or portions thereof) is directed to respective software modules, and executed. At 20, an invoice is generated that lists charges for using the downloaded software on a per-usage basis. For instance, if the print job includes 100 pages, and 14 of the pages use the downloaded software to print, then the invoice includes 14 charges (one for each use of the downloaded software.

According to an example, a print workflow includes several tasks such as print stream conversion, imposition, page numbering, bar coding, color transformation, etc. It may also include post print tasks such as cutting, folding, stapling/punching, etc. A workflow manager usually coordinates the flow of documents or data among the tasks in such a manner that the customer's requirements are met and there is a logical order to the flow of data among the tasks i.e., imposition is performed before printing which is performed before folding and which is performed before cutting. Based on the print consumer's requirements, an ad-hoc workflow is created to fulfill those requirements. Each of the tasks within the workflow is performed (or serviced) by a piece of software which may exist on the local computer or which may be downloaded from a vendor. To further this example, one or more such pieces of software (software modules) reside on the cloud. In another example, the software modules are downloaded to a print platform on the cloud from a vendor, such that the platform may host one or more tasks and a workflow manager that manages the tasks and/or software modules that perform the tasks.

Each of the software services within an ad-hoc workflow or may not be offered by the same vendor. As newer services are deployed by various vendors, each of them needs to be integrated into the workflow seamlessly and in a sequence as needed. Moreover, when such services are used, the vendor expects to be paid based on the amount of usage. It is likely that such downloaded software may be used only for a single print consumer and only for a small percentage of the print job. Thus, payment may need to be made at a micro-transaction level, i.e., charges are made at a page level, sheet level, image level, or a part thereof. With several vendors offering several types of services in software, it is reasonable that each service itself has the capability of accepting electronic payment and transferring it to the software author, creator, or vendor. Additionally or alternatively, if a trust relationship is formed between the workflow manager (at the print shop) and the vendor, the workflow manager may accept payment for services rendered by a certain service.

According to an example, and not by way of limitation, software services may include, e.g., red-eye reduction, picture enhancement, mailing services, printing services, etc. The vendor can be, for example, a programmer working from his home, a company that provides software services, or any other suitable vendor that provides cloud-based software services that can be employed when executing a print job. For instance, a user can place an order to have a print job done (e.g., 100 copies of a Christmas card with multiple photographs printed thereon). The print shop sends the order to the cloud-based print marketplace platform. If the marketplace platform does not have one or more of the services needed to process the print job, it looks to third-party vendors and retrieves the appropriate software services or modules. All services needed for the print job are incorporated into the workflow by the workflow task creation module, and executed by the workflow manager. Such service modules are, in this example, provided in part by the print shop, and in part by the marketplace platform and/or the third-party software service vendor(s).

It will be appreciated that the method of FIG. 1 can be implemented by a computer 30, which comprises a processor (such as the processor 102 of FIG. 3) that executes, and a memory (such as the memory 104 of FIG. 3) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, server farms, digital and analog can be employed in accordance with the present embodiment.

The computer 30 can include a processing unit (see, e.g., FIG. 3), a system memory (see, e.g., FIG. 3), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, WiFi, BlueTooth™, and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

FIG. 2 illustrates a method for verifying pay-per-usage charges in a cloud-based print software service environment via payment words. The method may be executed on a computer 30. At 40, an initial hashed word $W_0$ is provided to a software service (e.g., the platform vendor or its agent) for an initial usage of software downloaded from the software service. At 42, a subsequent hashed word $W_N$ is provided to the software service (e.g., the platform vendor or its agent) for a subsequent usage of the downloaded software. E.g., for a second software usage, a hashed word $W_1$ is provided, and so on. At 44, verification from the software service is received indicating that the subsequent hashed word is a valid part of the initial hashed word ($W_0$) chain. That is, the software service (e.g., in the cloud) performs a hash algorithm on $W_1$ to obtain $W_0$ and compare the obtained $W_1$ with the initial, print customer-provided hashed word $W_0$ to verify that the subsequent hashed word $W_N$ is a valid part of the $W_0$ chain, and indicates (e.g., to a workflow manager or controller executing the downloaded software and providing the hashed words) that the subsequent hashed word is valid.

At 46, certification of the initial hashed payment word $W_0$ and or subsequent hashed word is received (e.g., by the workflow manager and/or by the vendor or software service) from a cloud bank via which the print consumer pays the software service provider or vendor. This step may be performed at any time after the initial or subsequent hashed word is provided. That is, step 46 can be performed immediately after step 40 if desired. At 48, collected payment words are sent to the vendor providing the software service. For instance, an entire string of payment words (e.g., $W_0, W_1, W_2, \ldots, W_N$) are provided to the vendor, with each payment work representing a usage of the downloaded software. The vendor then submits the payment word string to the cloud bank for remuneration.

According to an example, a credit card with a secure socket layer (SSL) or transport layer security (TSL) type secure channel can be used for charging and settling payments. However, in such a scenario, an ample amount of trust is desirable in the cloud environment regarding the download and usage of software for an exact usage assessment. Oftentimes, downloaded software is pirated, overused, or charges are not paid for usage. Accordingly, a payment scheme is described herein wherein the software service consumes a micropayment "set of bytes or words" before it renders its services. When payment "words" are no longer available, or when a predetermined time period expires, the software is rendered unusable and is flushed from the workflow manager processor(s). It is once again downloaded on demand when as a subsequent job requires such a software service.

According to an example, a chain of payment words are created for a certain customer to be used with a certain vendor, such that:

$$w_0 \leftarrow w_1 \leftarrow w_2 \leftarrow \ldots \leftarrow w_N$$

That is, a print customer signs $W_0$ (e.g., electronically or digitally) and gives it to the vendor along with a certified copy of $W_0$ from the "cloud bank". An expanded technique can be used for multiple vendors. The payment word $W_0$ is called the root of the chain is obtained from a payment word $W_N$ through repeated hashing (using a one-way collision free hash function such as SHA-1 or MD5). Each of the intermediate hashed words $W_{N-1}, W_{N-2}, \ldots,$ are part of the payment word chain that is consumed (e.g., in reverse order) by the software service as it renders its services for a certain page. Thus, $W_0$ is given by the workflow manager acting on behalf of the print consumer to the software service for transforming or printing a certain page or sheet of paper. For performing a transformation on the second sheet of paper, the workflow manager provides $W_1$. The software service computes a hash on $W_1$ to obtain $W_0$ and verifies that $W_1$ is part of the chain. The same procedure is applied to $W_2$, $W_3$ and so on.

Prior to using the payment word chain of hashed words, the word $W_0$ is certified by the "cloud bank" (i.e., a banking system or entity in the cloud to provide for cash, debit, credit, etc., payment services.) Each time the software service is used, the workflow manager presents the words $W_0$, $W_1, \ldots, W_N$, to the software service vendor. The software service performs a hash of the latest received payment word and compares it with the contiguously previous word (i.e., the payment word received immediately before the latest received payment word) and, if it matches, the software provides its services on the page of the print job. In this manner, the vendor can confirm $W_1$ from $W_2$ (e.g., by hashing $W_2$), but cannot counterfeit $W_3$.

Upon completion of the task (e.g., a set of pages) during the print job, the collected payment words are sent to the vendor providing the software service. The vendor can redeem them with the cloud bank or deduct them from the customer's account. For each different vendor, a different word chain is created by the workflow manager acting on behalf of the consumer together with the cloud bank. The workflow manager can reside, for example on a local computer, a remote computer, and/or on a platform in the cloud. To simplify the process, the workflow manager can accept a large credit card pre-payment from the print consumer and transform the payment into several pay word chains (e.g., one for each vendor who provides the services). Part of the money so obtained by the workflow manager is transferred to the cloud bank, which reimburses each of the vendors when they provide the word chains obtained from the workflow manager. According to one aspect, vendors are permitted to specify how they prefer to be paid (e.g., per use, per page, per document, per print job, etc.)

The payment words can be viewed as tokens or the like, which the vendor collects for each service rendered, and then redeems with a cloud bank that services several print shops. The vendor can receive the payment words from either the consumer directly, the print shop, or the print platform in the cloud, or a combination thereof. The print shop and/or the consumer can also prepay (e.g., using a credit card or the like) for a predetermined number of payment words, or tokens. For instance, the cloud bank in this example receives a payment of X dollars, and generates N payment words at Y cents per payment word. The consumer and/or print shop can also request a refund for any payment words that remain unused upon completion of the print job.

Figure 3:
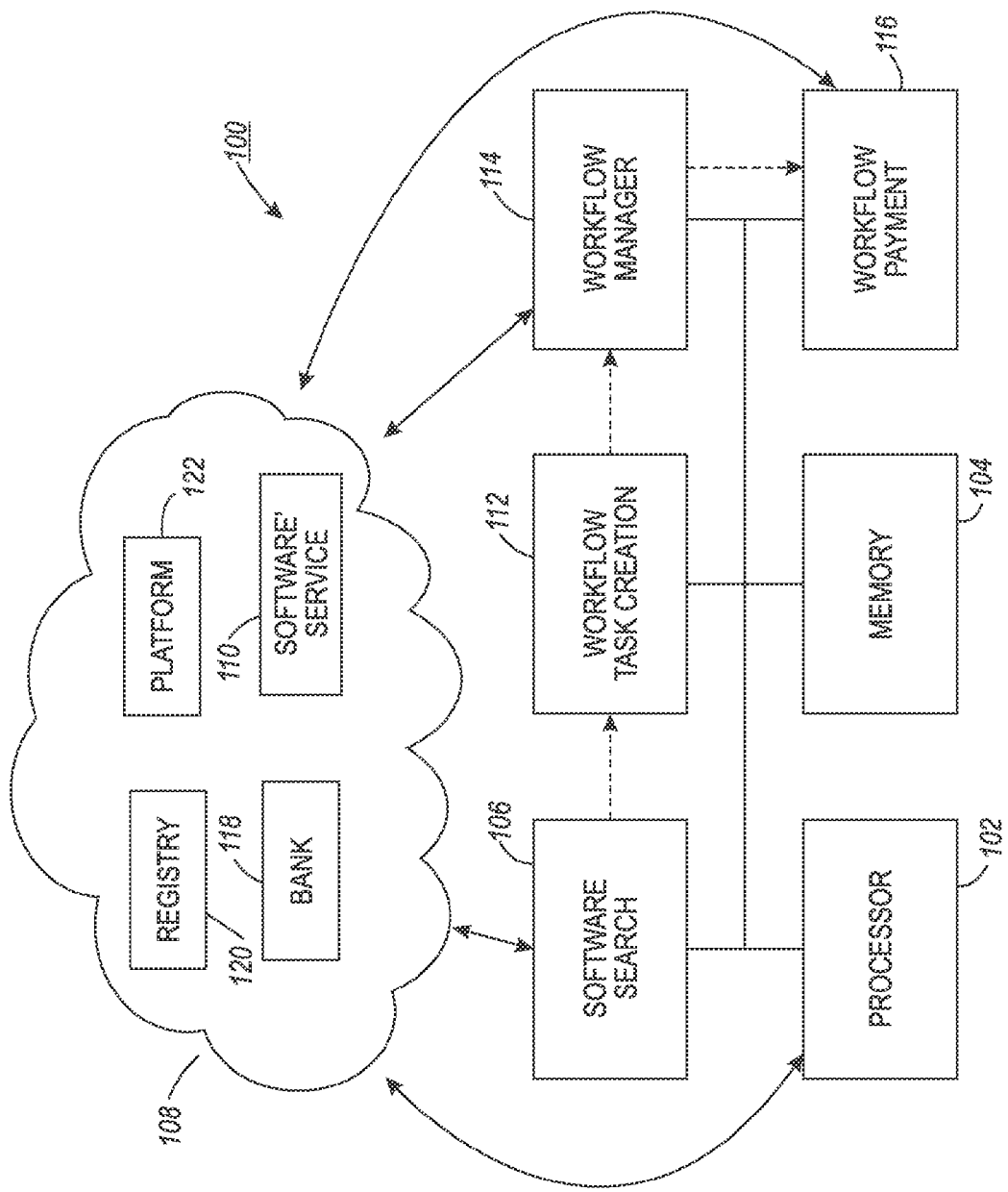
FIG. 3 illustrates a system that facilitates automated identification and insertion of appropriate software for performing all or a portion of a print job or task, as well as micropayment verification for each usage of the software, in accordance with various aspects described herein.

FIG. 3 illustrates a system 100 that facilitates automated identification and insertion of appropriate software for performing all or a portion of a print job or task, as well as micro-payment verification for each usage of the software, in accordance with various aspects described herein. The system 100 comprises a processor 102 that executes, and a memory or computer-readable medium 104 that stores, computer-executable instructions for performing the various functions, methods, algorithms, etc., described herein. The system 100 further comprises a software search module 106 that communicates with the cloud 108 and searches for and identifies print software services 110 that satisfy a print consumer's needs (e.g., as specified by the customer), in the event that the print shop's software cannot meet the customer's specifications. In one example, the software search module sends a request to the cloud and obtains a set of vendors supplying downloadable software that matches the print consumer's requirements.

A workflow task creation module 112 selects the best software from amongst the various vendors and places the downloaded software in the rightful place of the workflow. A workflow manager 114 directs the print job to various respective software modules for processing (i.e., execution of the print job). A workflow payment module provides payment words to the software service 110 in the cloud 108, as described with regard to FIG. 2. Once the vendor of the software service receives the payment word(s), the vendor can submit the payment word(s) to the cloud bank 118 and collect payment. Additionally, the cloud includes a registry 120 where one or more searchable vendors is registered.

According to an example, and not by way of limitation, software services may include, e.g., red-eye reduction, picture enhancement, mailing services, printing services, etc. The vendor can be, for example, a programmer working from his home, a company that provides software services, or any other suitable vendor that provides cloud-based software services that can be employed when executing a print job. For instance, a user can place an order to have a print job done (e.g., 100 copies of a Christmas card with multiple photographs printed thereon). If the print shop system does not provide one or more of the services needed to process the print job, it looks to third-party vendors and retrieves the appropriate software services or modules. All services needed for the print job are incorporated into the workflow by the workflow task creation module, and executed by the workflow manager. Such service modules are, in this example, provided by the print shop, the third-party software service vendor(s), by non-software service providers, or any combination thereof.

As stated above, the system 100 comprises the processor 102 that executes, and the memory 104 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

Figure 4:
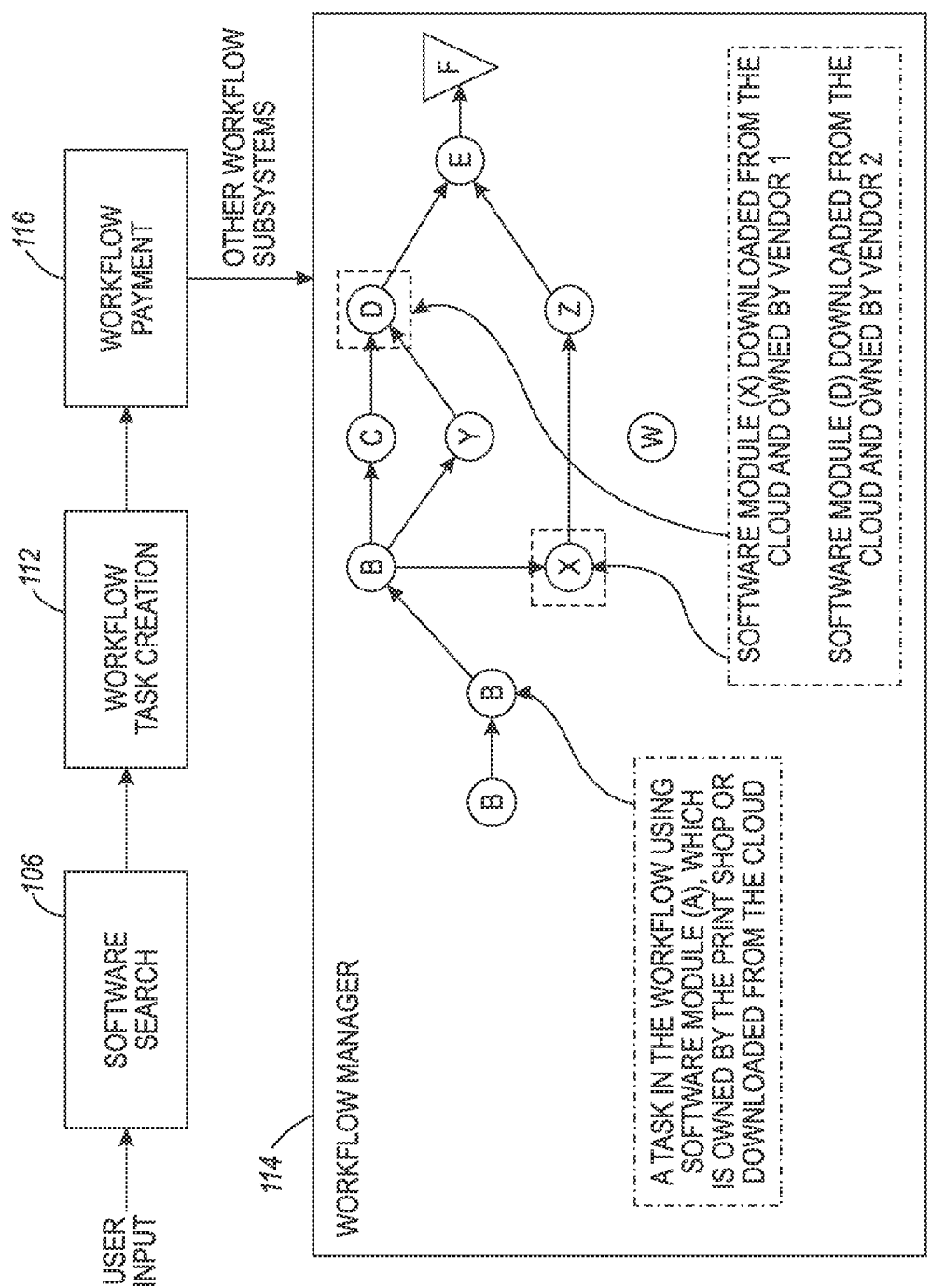
FIG. 4 is an illustration of the workflow management module in greater detail, in accordance with various aspects described herein.

FIG. 4 is an illustration of the workflow management module 114 in greater detail, in accordance with various aspects described herein. A user inputs software specifications into the software search module 106, which sends user requirement information to the cloud (FIG. 3). In one example the software search module 106 converts the user requirement information into a searchable (e.g., XML) form. The workflow task creation module 112 selects a best-fit software service or module from the cloud for placement in the print job workflow at the proper position in the workflow. The workflow payment module 116 interacts with each software service module to ensure that payment is made on a per use basis. One or more other workflow modules may also be employed.

The workflow manager 114, in the example of FIG. 4, includes a starting point (S) and a finishing point (F), with several workflow paths in between. A first task uses a piece of software (A) (i.e., a module or service) that is owned by the print shop performing the print job or is downloaded from the cloud (i.e., from a vendor). From software module (A), the workflow proceeds to software module (B). From software module (B), several workflow paths are possible. For instance, the workflow can follow a path B-C-D-E-F, a path B-Y-D-E-F, or a path B-X-Z-E-F. In any case, each letter represents a task in the workflow or software module that performs a function or action (i.e., a task) during the print job. A software module (W) is also shown, which is not employed in the particular workflow path examples of FIG. 4.

Whenever software module (D), (X), and/or (A) is executed to perform a task in the print job workflow, a payment word $W_N$ is issued and provided to corresponding software vendor or software service. Each payment word is then decoded (hashed) for verification and redeemed by the vendor (e.g., via a cloud bank) for a micro payment for each use of the software module provided by the vendor, as set forth with regard to the method of FIG. 2.

In one example, vendor-provided software modules (e.g., X, D, etc.) are deactivated after each use, and must be reactivated by submitting a payment word for each service prior to a subsequent use. In another example, the vendor-provided software is re-downloaded for each use. In another example, the vendor-provided software resides in the cloud and the print job data is transmitted to the cloud platform 122 and back to permit the vendor-provided software to perform its task.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of providing cloud-based software services to a print customer, comprising:
   requesting information related to one or more vendors that supply downloadable software that satisfies a print consumer's specified print job requirements;
   receiving the requested information;
   selecting one of the one or more vendors;
   downloading the software from the selected vendor;

inserting the downloaded software at a selected point in a print job workflow;
executing a print job using the print job workflow with the inserted software; and
billing the print consumer on per-use basis for use of the downloaded software.

2. The method of claim 1, further comprising:
providing an initial hashed payment word $W_0$ for an initial downloaded software use;
receiving certification from a cloud bank that the initial payment word is a valid payment word;
providing a subsequent hashed payment word for each subsequent use of the downloaded software; and
providing a payment word chain comprising the initial hashed payment word and each successive hashed payment word to the vendor of the downloaded software.

3. The method of claim 2, further comprising permitting the vendor to redeem individual hashed payment words for micropayments from the cloud bank for each use of the downloaded software.

4. The method of claim 2, further comprising permitting the vendor to redeem the entire chain of hashed payment words for payment from the cloud bank for all used of the downloaded software during a given print job.

5. The method of claim 2, further comprising receiving verification from the vendor that each subsequent hashed payment word is a valid payment word in the chain of the initial hashed payment word.

6. The method of claim 5, wherein the vendor performs a hash algorithm on each subsequent hashed payment word to verify that it corresponds to a contiguously previous preceding hashed payment word, back to the initial hashed payment word, in order to verify that each subsequent hashed payment word is a valid payment word prior to each corresponding use of the downloaded software.

7. The method of claim 2, further comprising deactivating the downloaded software after each use, and reactivating the downloaded software upon transmission of each subsequent payment word.

8. A processor configured to execute computer executable instructions for performing the method of claim 1.

9. A method of making micropayments for each use of a cloud-based software module, comprising:
providing an initial hashed payment word $W_0$ for an initial downloaded software use;
receiving certification from a cloud bank that the initial payment word is a valid payment word;
providing a subsequent hashed payment word for each subsequent use of the downloaded software; and
providing a payment word chain comprising the initial hashed payment word and each successive hashed payment word to the vendor of the downloaded software.

10. The method of claim 9, further comprising permitting the vendor to redeem individual hashed payment words for micropayments from the cloud bank for each use of the downloaded software.

11. The method of claim 10, further comprising permitting the vendor to redeem the entire chain of hashed payment words for payment from the cloud bank for all used of the downloaded software during a given print job.

12. The method of claim 10, further comprising receiving verification from the vendor that each subsequent hashed payment word is a valid payment word in the chain of the initial hashed payment word.

13. The method of claim 12, wherein the vendor performs a hash algorithm on each subsequent hashed payment word to verify that it corresponds to a contiguously previous hashed payment word, back to the initial hashed payment word, in order to verify that each subsequent hashed payment word is a valid payment word prior to each corresponding use of the downloaded software.

14. The method of claim 10, further comprising deactivating the downloaded software after each use, and reactivating the downloaded software upon transmission of each subsequent payment word.

15. The method of claim 10, wherein a print consumer pre-purchases a plurality of payment words, each payment word being provided to the vendor prior to each use of the downloaded software.

16. A processor configured to execute computer executable instructions for performing the method of claim 9.

17. A system that facilitates providing cloud-based software services to a print customer, comprising:
a processor configured to execute persistently stored computer-executable instructions, the instructions comprising:
a software search module that requests information related to one or more vendors that supply downloadable software that satisfies a print consumer's specified print job requirements;
a workflow task creation module that receives the requested information, selects one of the one or more vendors, downloads the software from the selected vendor, and inserts the downloaded software at a selected point into a print job workflow; and
a workflow manager that executes the print job using the print job workflow with the inserted software, and bills the print consumer on per-use basis for use of the downloaded software.

18. The system of claim 17, the instructions further comprising a payment module that:
provides an initial hashed payment word $W_0$ for an initial downloaded software use;
receives certification from a cloud bank that the initial payment word is a valid payment word;
provides a subsequent hashed payment word for each subsequent use of the downloaded software; and
provides a payment word chain comprising the initial hashed payment word and each successive hashed payment word to the vendor of the downloaded software.

19. The system of claim 18, wherein the vendor verifies that each subsequent hashed payment word is associated with the initial hashed payment word, and redeems hashed payment words for micropayments from the cloud bank.

20. The system of claim 19, wherein the vendor performs a hash algorithm on each subsequent hashed payment word to verify that it corresponds to contiguously previous hashed payment word, back to the initial hashed payment word, in order to verify that each subsequent hashed payment word is a valid payment word prior to each corresponding use of the downloaded software.

* * * * *